Jan. 7, 1958 S. J. HARETIK ET AL 2,818,602
PUTTY TOOL
Filed April 18, 1956

INVENTOR.
Stephen J. Haretik
BY Irvin W. McCulley
Hyde, Meyer, Baldwin & Doran
Attorneys 2,818,602
Patented Jan. 7, 1958

2,818,602

PUTTY TOOL

Stephen J. Haretik, Maple Heights, and Irvin W. McCulley, Cleveland, Ohio

Application April 18, 1956, Serial No. 578,980

2 Claims. (Cl. 18—3.5)

This invention relates to improvements in a tool for smoothing putty on a pane and sash.

One of the objects of the present invention is to provide a tool for smoothing putty and having a putty smoothing surface of adjustable length for accommodation to different size windows.

A further object of the present invention is to provide a tool for smoothing putty with said tool including two plates identical in shape and size except for the angle of bend in one of the plates.

A further object of the present invention is to provide a tool having a multiplicity of uses including driving glazier points and smoothing putty on a pane and sash in any one of a multiplicity of different manners.

A further object of the present invention is to provide a tool for smoothing putty on a pane and sash wherein the putty smoothing surface is maintained at a constant angle with respect to the sash and pane in putty application.

A further object of the present invention is to provide a tool for smoothing putty characterized by its structural simplicity, inexpensive manufacturing costs, ease of assembly, ease of adjustment, strong and sturdy nature, and many advantageous operational features.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 6 is a transverse sectional view showing the tool being used in a second manner; while

Figure 1:
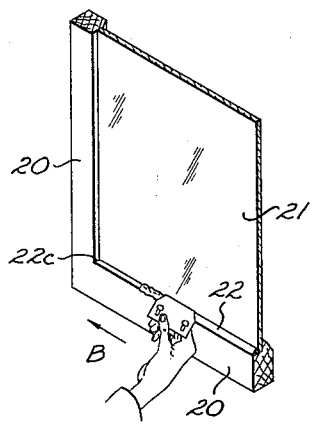
Fig. 1 is a perspective view of the tool being used to smooth putty on a pane and sash.

Before the tool here illustrated in specifically described, it is to be understood that the invention here involved is not limited to the structural details or arrangement of parts here shown since tools embodying the present invention may take various forms. It also is to be understood that the phraseology or terminology herein employed is for purposes of description and not of limitation since the scope of the present invention is denoted by the appended claims.

While the illustrated tool and its component parts may be adapted to various uses, it has been chosen to show the same for smoothing putty on a pane and sash. However, the tool may be used equally well in glazing a glass pane in a door, etc.

The tool includes a first plate 10 having two interconnected coplanar portions 10a and 10b and a second plate 12 having two angularly disposed and interconnected portions 12a and 12b located on opposite sides of a bend 12c therein.

Figure 3:
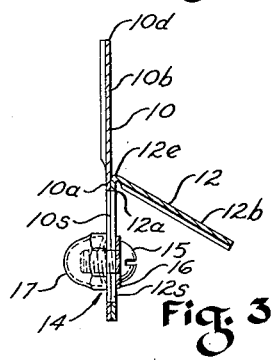
Fig. 3 is a transverse sectional view of the tool taken along the line 3—3 of Fig. 2.
Figure 4:
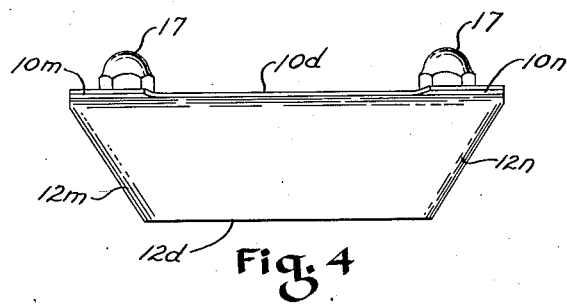
Fig. 4 is a side elevational view of the tool.

Suitable fastening means is provided for adjustably connecting together one portion of each plate, such as portions 10a and 12a. These portions of the plate are held in overlapping relationship in the manner shown in Fig. 3 by the fastening means so that an obtuse angle, such as approximately 120 degrees, is provided between portions 10b and 12b in Fig. 3. The fastening means include spaced apart pairs of parallel, coinciding, elongated slots 10s, 12s in plate portions 10a and 12a with the slots extending perpendicular to the distal edge 10d on plate 10. The fastening means includes two fastener elements 14 with one extending through each pair of coinciding slots 10s, 12s for releasably clamping portions 10a and 12a together. Each fastener element includes a screw 15, serrated lock washer 16 and lock nut 17.

The tool is easily used for smoothing putty on a pane and sash by moving the tool in the direction of arrow B in Fig. 1. Sash 20 in Fig. 5 has a glass pane 21 placed therein with putty 22 shown in its smoothed and finished position after use of the tool. The putty is forced into this position by having planar guide surface 12g of plate portion 12b travel along outer surface 20a of sash 20 parallel to plane 21 and by having planar putty smoothing surface 10g on portion 10b travel along and form the exterior surface of putty 22 while its distal end 10b is located closely adjacent the pane 21 to form the putty surface in this contour right up to the outer surface of the pane 21. The tool is easily manipulated in this manner because plate portions 10a and 12a, extending away from and connecting together surfaces 10b and 12b, serve as a hand grip during tool manipulation. Also, a finger grip is provided by aligned holes 10h and 12h in plate portions 10a and 12a in the manner shown in Fig. 1. These holes are conveniently located between the pairs of slots 10s and 12s in the middle of the tool.

Figure 5:
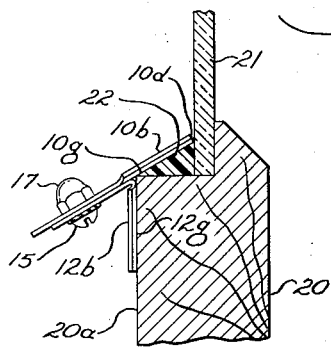
Fig. 5 is a transverse sectional view of the tool being used in the manner shown in Fig. 1.

Guide surfaces 10g and 12g have leading and trailing edges 10m, 10n, 12m and 12n properly formed for guiding the travel of the tool over the sash 20 and putty 22, for properly forming the putty 22 in the desired contour shown in Fig. 5, and for forming a properly mitered corner 22c in Fig 1 at the intersection of two putty surfaces. Each of these edges is curved out of its planar guide surface and is beveled at an obtuse angle, such as approximately 120 degrees, with its adjacent distal edge 10d or 12d. Hence, the tool will easily guide over sash 20 and putty 22, and as the tool approaches corner 22c, the corner will be properly mitered. Also, the curvature of the leading edge on plate portion 10b out of its planar guide surface 10g will tend to knead putty 22 down into the form shown in Fig. 5 so that the putty will completely fill the form shown and the outer surface of the putty will be completely smooth.

This tool construction also permits adjustability for different size windows so as to allow for any variation in the distance between the outer surface 20a of sash 20 and pane 21. Fastener elements 14 may be easily loosened and plate 10 may be extended or retracted to adjust the protrusion of its distal edge 10d from guide surface 12g so that the distal edge 10d may be located closely adjacent pane 21 in any size window.

Throughout the range of adjustment of the protrusion of distal edge 10d from guide surface 12g, the angle between surfaces 10g and 12g is maintained constant so that the surface of putty 22 will always have the same angular contour with respect to the surface 20a of sash 20 and so that mitered corner 22c will be accurately and properly formed in all positions of protrusion of distal edge 10d regardless of the distance between the outer surface 20a of sash 20 and pane 21.

This tool is inexpensive to manufacture because plates 10 and 12 are identical in shape and size except for the angle of bend at bend 12c in plate 12.

Figure 2:
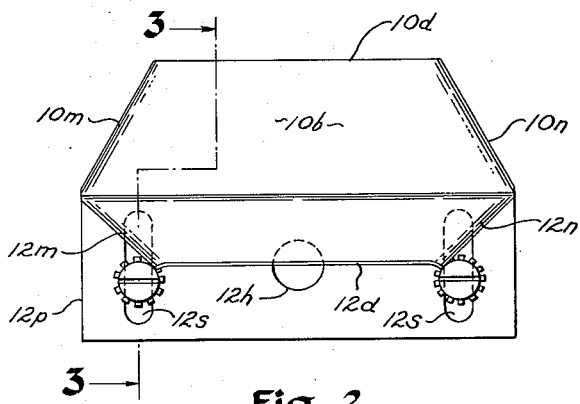
Fig. 2 is a bottom view of the tool in Fig. 1.

The tool may be also used as a glazier point driver for firmly securing pane 21 in sash 20 prior to the application of putty 22 thereto. For glazier point driving, the tool is disassembled by detaching the fastener elements 14 and plate 10 from plate 12. Then, plate portion 12a has its outer face placed against pane 21 in planar relationship while plate portion 12b is grasped in the hand of the user. Then, plate edge 12p in Fig. 2 is used as a glazier point driving surface as the plane 12 is reciprocated back and forth across the surface of pane 21.

The mode of operation may be easily summarized. Dismantled plate 12 may be reciprocated across pane 21 to push or tap glazier points into sash 20 to firmly hold pane 21 in its proper place prior to application of the putty 22. Then the tool is reassembled and adjusted so that distal edge 10d is closely adjacent to window pane 21 when guide surface 12g is riding on sash 20, as shown in Fig. 5. The putty may be roughly forced into place by placing it in the corner shown in Fig. 5 as formed by sash 20 and pane 21 and then by moving the tool in the direction shown by arrow A in Fig. 5 to generally form the putty contour. Then, the tool guide surface 20g is held against sash 20 and moved in the direction of arrow B in Fig. 1 to smooth the putty 22 by surface 10g until the tool stops against the adjoining sash member to form the proper mitered corner 22c.

The putty may be placed roughly in position by an optional method. The putty may be formed into a small roll and placed where the glass and wood meet. Then, the putty may be kneaded and applied with the left hand while the tool is worked with the right hand.

Figure 6:
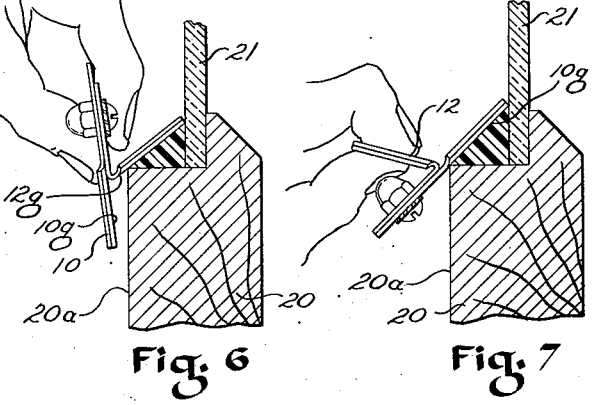
Figure 7:
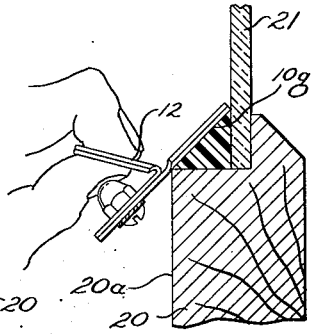
Fig. 7 is a transverse sectional view of the tool being used in a third manner.

Figs. 6 and 7 illustrate the universal features of the tool by disclosing alternative methods of smoothing putty with other surfaces of the tool under other conditions. In Fig. 7, fastener elements 14 are disassembled and plate 10 is reversed prior to reassembly so that surface 10g faces outwardly instead of inwardly.

Various details and arrangement of parts can be made by one skilled in the art without departing from either the spirit of this invention or the scope of the appended claims.

What is claimed is:

1. A tool for smoothing putty on a pane and sash, comprising a planar guide surface adapted to travel along the sash parallel to the pane, a planar putty smoothing surface having a distal edge adapted to be located closely adjacent the pane, and connecting means adjustably connecting said surfaces for permitting adjustment of the protrusion of the distal edge from said guide surface while maintaining a given angle between said surfaces, said connecting means extending away from said surfaces to serve as a handgrip portion during tool manipulation, both of said surfaces having leading and trailing edges curved out of the plane of their respective surfaces with each edge beveled at an obtuse angle with its associated distal edge for respectively guiding the travel of said tool and for forming a properly mitered corner on the putty in all positions of protrusion adjustment.

2. A tool for smoothing putty on a pane and sash, comprising a first plate having two interconnected coplanar portions, a second plate having two angular disposed and interconnected portions located on opposite sides of a bend therein, both of said plates being identical in shape and size except for the bend in said second plate, and fastening means operatively connecting together and permitting adjustment between one portion of each plate so that the other portion of one plate has a planar guide surface adapted to travel along the sash parallel to the pane and so that the other portion of the other plate has a planar putty smoothing surface having a distal edge adapted to be located closely adjacent the pane with the protrusion of its distal edge from said guide surface being adjustable while maintaining a given angle between said surfaces, both said other portions having leading and trailing edges curved out of the plane of their respective surfaces with each edge beveled at an obtuse angle with its adjacent distal edge for respectively guiding the travel of said tool and for forming a properly mitered corner on the putty in all positions of protrusion adjustment, said one portions of said plates being held in overlapping relationship by said fastening means, said fastening means including spaced apart pairs of parallel coinciding elongated slots in said one portion of both said plates extending generally perpendicular to said distal edge and including two fastener elements with one extending through each pair of coinciding slots for releasably clamping said one portions together, said one portions having aligned holes between said pairs of slots to provide a finger hold therein for tool manipulation, each fastener element including a screw and lock nut.

References Cited in the file of this patent
UNITED STATES PATENTS

| | | |
|---|---|---|
| 1,390,126 | Halaska, Jr. | Sept. 6, 1921 |
| 1,412,728 | Werner | Apr. 11, 1922 |
| 1,604,792 | Skogberg | Oct. 26, 1926 |
| 2,759,218 | Smith | Aug. 21, 1956 |